Apr. 24, 1923.

O. G. HOLWAY 1,452,639

VEHICLE TRUNK RACK

Filed Feb. 9, 1922

Inventor
O. G. Holway
by his Attorneys
Baldwin & Wight

Patented Apr. 24, 1923.

1,452,639

UNITED STATES PATENT OFFICE.

ORLANDO G. HOLWAY, OF CHIPPEWA FALLS, WISCONSIN.

VEHICLE TRUNK RACK.

Application filed February 9, 1922. Serial No. 535,176.

*To all whom it may concern:*

Be it known that I, ORLANDO G. HOLWAY, a citizen of the United States, and a resident of Chippewa Falls, in the county of Chippewa and State of Wisconsin, have invented certain new and useful Improvements in a Vehicle Trunk Rack, of which the following is a full, clear, and exact description.

My invention relates to a carrier adapted to be placed upon a vehicle, particularly at the rear of an automobile, that can be employed for the support of a trunk, box, bedding roll, or any similar package. One object of the invention is to produce such a carrier that will be simple of construction and efficient in operation.

Another object of the invention is to provide such a device that will be easily detachable when its use is not desired, but can be quickly replaced.

A further object is to provide a carrier that is also adapted to support a spare tire in addition to the trunk or other package carried thereby.

Further objects will be apparent from the following detailed description and the appended claims.

Figure 1:
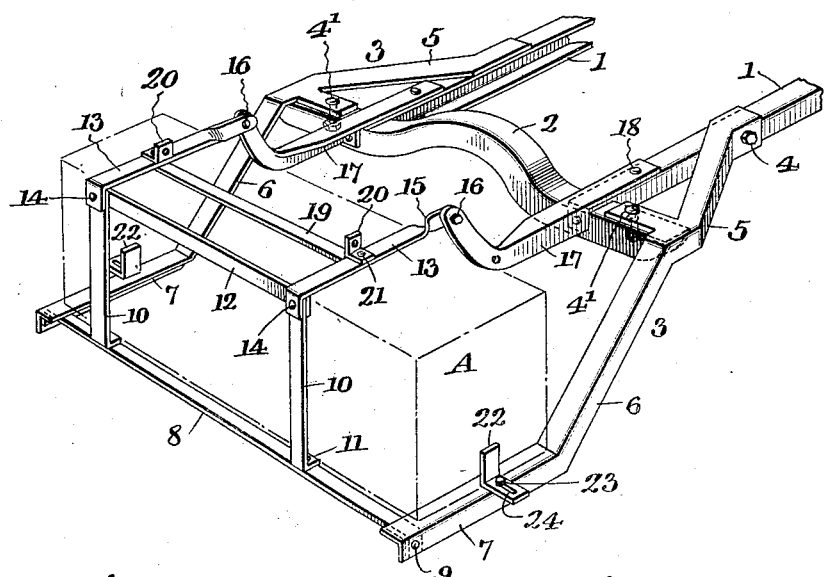
Figure 1 is a perspective view of the device attached to an automobile.

The drawings show the two side bars 1 and the rear cross bar 2 of the chassis of an automobile. Attached to the side bars 1 by fastenings 4 and to the cross bar 2 by fastenings 4' are two side bars 3 of the attachment each having an outwardly extending portion 5, a downwardly extending portion 6 and a horizontal bottom portion 7. The rear ends of the bottom portion 7 are joined to a bar 8 by bolts or other pivotal fastening devices 9. Upwardly extending standards 10 are attached to the cross bar 8 by bolts or equivalent fastenings 11. The tops of the standards 10 are joined by a bar 12, and from each standard 10 extends forwardly a bar 13. The bar 13, bar 12 and standard 10 are joined by a common bolt of similar fastening 14.

Near their forward ends the bars 13 have a half twist 15 and front ends lie in a vertical plane and are attached by removable pins 16 to the rear ends of member 17 that are attached by fastenings 18 to the side bars 1 and form substantially continuations of the same. The two bars 13 are joined at about their middle by a bar 19 and the same fastenings 21 that connect the bar 13 and the bar 19 serve to attach angle pieces 20 having vertical arms. Similar but larger angle pieces 22 are attached to the members 7 by means of bolts 23 working in slots 24. By adjustment of these latter angle pieces the box or trunk indicated in dotted lines and designated A may be retained against side movement. If the size of the trunk requires it, they may be turned to the opposite position shown in Figure 3.

Figure 4:
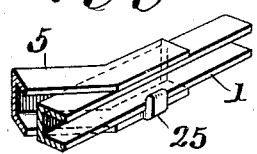
Figures 4 and 5 are detail views of alternative fastening means for attaching the device to the vehicle.
Figure 5:
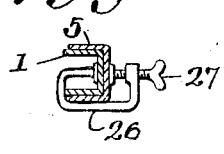

The side members 3 may be either angle irons or channel irons. If the latter are used, their front ends may be held in position by a turned up lug 25 as shown in Figure 4 or by the common form of clamp 26 with thumb screw 27 shown in Figure 5.

Figure 2:
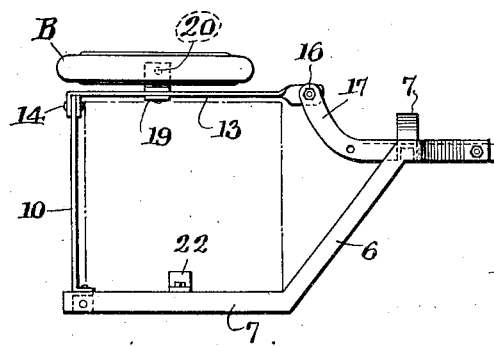
Figure 2 is a side elevation of the same.
Figure 3:
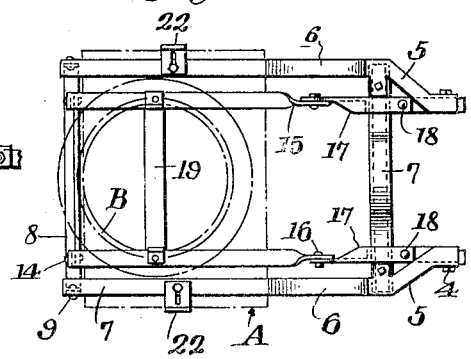
Figure 3 is a top plan view.

The upper bars 13 and 19 afford a convenient support for a spare tire as shown in Figures 2 and 3 where such a tire B is shown. The angle pieces 20 assist in holding the tire in position.

The trunk may be held in position by straps or ropes passing around the same and the bars 8, 12 and 19, or from side to side over the members 7 and the bars 13. The adjustable members 22 will also assist in holding the trunk or other package in firm position.

The pivots 9 and removable pins 16 permit the top and back of the frame to be swung rearwardly when it is desired to place the trunk in position or remove the same.

It is obvious that the exact means for fastening the members 3 and 13 to the chassis and the form of these members may necessarily vary somewhat according to the type of machine to which the attachment is applied, and such variations are considered within the scope of my invention.

While the device is very efficient for the purpose of supporting an article on a vehicle, it is easy of construction and can be readily placed upon the machine. It requires no change in the machine except the provision of a few bolt holes. In some cases bolts already in the machine may be replaced by longer ones which will serve as attaching members.

I claim as my invention.

1. A vehicle trunk rack comprising members extending outwardly, downwardly and then rearwardly from the side bars of a chassis, a horizontal bar connecting the rear ends of said members, standards rising from said bar, a cross bar attached to the upper ends of said standards, bars extending forwardly from the upper ends of the standards, and means for fastening said bars to the said side bars.

2. A vehicle trunk rack comprising members attached at their forward ends to the side bars of a chassis, each of said members extending outwardly, then downwardly and rearwardly, and finally rearwardly in a horizontal plane, a bar connecting the rear ends of said members, standards connected thereto, forwardly extending bars connected to the standards, a cross bar connecting said last-named bars, and means for attaching the last-named bars to the chassis.

3. A vehicle trunk rack comprising members attached at their forward ends to the chassis of a vehicle and having rear horizontal portions in a lower plane, a cross bar connecting the rear ends of said portions, standards rising therefrom, forwardly extending bars attached to the standards, and means for connecting said bars to the chassis.

4. A vehicle article support comprising side members attached at their front ends to the frame of the vehicle, and having horizontal rear portions, a transverse bar connecting said portions, standards rising therefrom, means for connecting the standards at their upper ends, and means for connecting the upper ends of the standards to the vehicle frame.

5. A vehicle article carrier comprising side members attached at their front ends to the frame of the vehicle, and having rear supporting portions, a transverse bar connecting said portions, standards rising therefrom, means for connecting the upper ends of the standards to the frame of the vehicle, and adjustable engaging members carried by said rear supporting portions.

6. A vehicle article carrier comprising side members attached at their front ends to the frame of the vehicle, a bar connecting the rear portions of said members, standards rising therefrom, upper members connected at their ends to the standards and the vehicle frame respectively, angle irons on said upper members, and a transverse bar connecting the upper members, said members, bar and angle irons affording a support for a tire.

7. A vehicle article carrier comprising a frame work detachably connected to the vehicle frame, said frame work comprising lower bars upon which an article may rest and adjustable retaining members to engage the ends of said article, and upper bars retaining the article at the top and affording a support for a spare tire.

In testimony whereof, I have hereunto subscribed my name.

ORLANDO G. HOLWAY.